United States Patent Office 3,445,322
Patented May 20, 1969

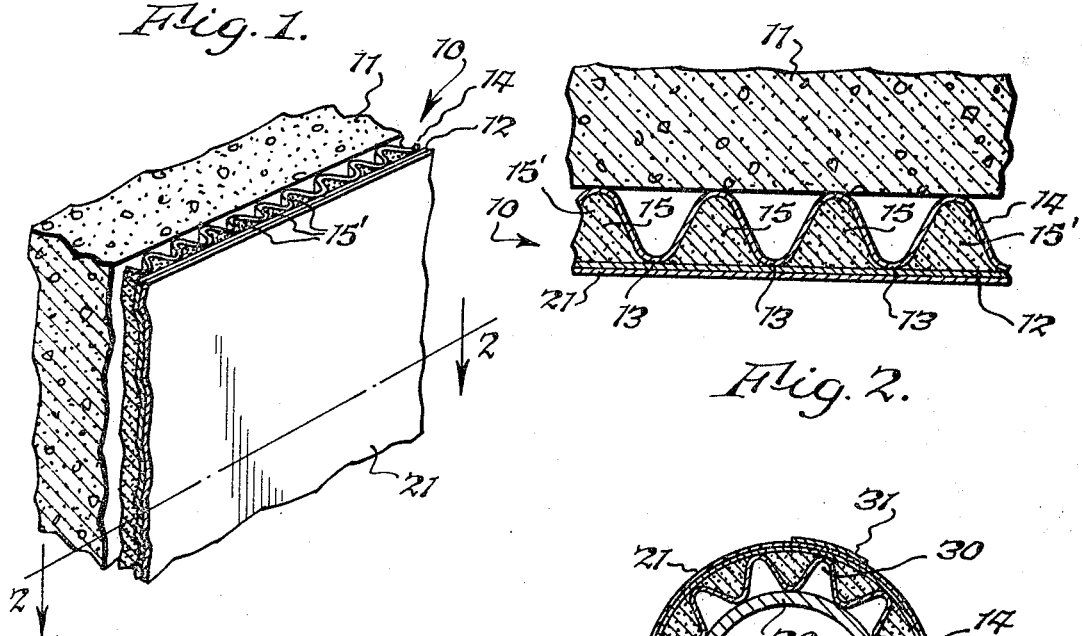
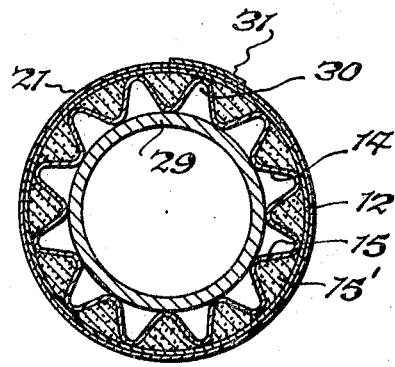
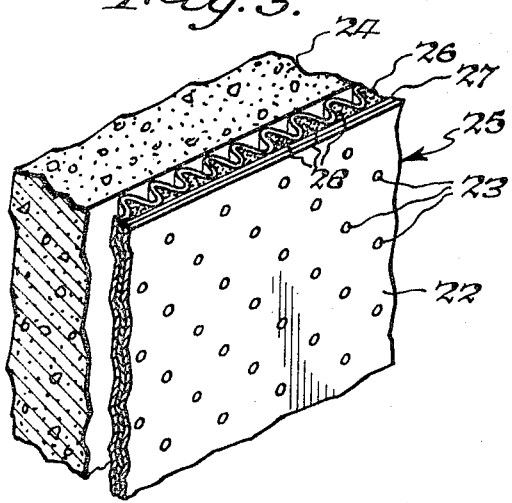
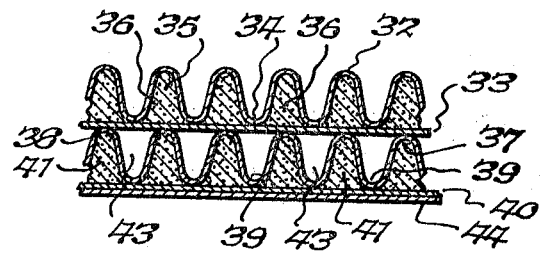
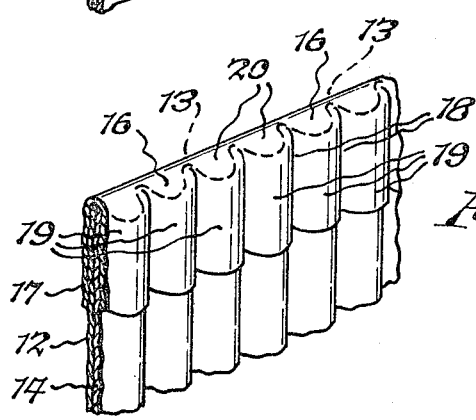
INVENTOR.
Louis L. Chiusolo and
Samuel N. Saiia
Bean, Brooks, Buckley & Bean
ATTORNEY.

3,445,322
LAMINATED BUILDING COMPONENT
Samuel N. Saiia, Cheektowaga, and Louis L. Chiusolo, Lewiston, N.Y., assignors, by direct and mesne assignments, of thirty-three and one-third percent each to Ignatius T. Agro and Charles Cassaro, both of Buffalo, and Louis L. Chiusolo, Lewiston, N.Y.
Filed Oct. 18, 1965, Ser. No. 497,245
Int. Cl. B32b 3/10, 3/26, 5/18
U.S. Cl. 161—113                                    3 Claims

ABSTRACT OF THE DISCLOSURE

A water barrier laminate including a porous casing member, compartments in said laminate for holding bentonite clay in position against a wall and a tenacious plastic membrane forming the outside of the laminate for preventing rupture thereof. The plastic membrane may be either continuous or perforate.

---

The present invention relates to a laminated building component which is utilized for the purpose of impeding the flow of liquid, such as water, and for the further purpose of providing thermal insulation in a permanent and highly efficient manner.

In the past, bentonite clay was widely used in various forms as a coating for masonry walls and the like to act as a water barrier. Generally, finely divided bentonite clay was fabricated into a laminate with water absorbent paper sheathing which was placed in position against the outside of a foundation wall and thereafter the earth was backfilled into the space adjacent the wall to hold the laminate in place. When the bentonite was exposed to water through the absorbent action of the sheathing, it swelled to provide a water barrier. However, the foregoing laminate was subject to certain shortcomings. More specifically, the back filling had to be done very carefully and slowly to prevent the abrasive action of the dirt from tearing the water absorbent sheathing apart and thus destroying the water barrier provided by a continuous layer of bentonite clay. The careful back filling included holding a protective panel against the outer surface of the laminate and slowly withdrawing this panel as the back filling progressed to thereby insure the gentle depositing of dirt against the outside of the laminate. However, this procedure was also subject to the shortcoming of displacing the laminate or possibly rupturing the absorbent sheathing incidental to withdrawal of the protective panel, when the latter was pressed against the laminate by the lateral thrust of the earth.

Another shortcoming of the foregoing laminate was that the permeable sheathing deteriorated incidental to the passage of water therethrough and thus eventually, in effect, dissolved. Thereafter, repeated exposure of the bentonite clay to flowing water eventually eroded the layer of this material until the point was reached where it could no longer serve as a protective barrier against water seepage. In other words, the effective length of time that the bentonite clay could provide a water barrier was severely limited. It is with overcoming the foregoing shortcomings of the prior art as well as providing a novel manner of utilizing bentonite clay, in conjunction with other materials, as an improved laminate to impede the seepage of water and in addition to provide thermal insulation that the present invention is concerned.

It is accordingly one object of the present invention to provide an improved laminate including bentonite clay, which is thin and relatively lightweight, and therefore can be easily handled, and which will both impede the flow of water and provide effective thermal insulation, both when used on the inside and outside of masonry walls, or on the outside of liquid carrying conduits.

Another object of the present invention is to provide an improved thermal insulating and water impeding laminate which is highly abrasion resistant and therefore can be placed in position against the outside of a masonry wall to permit the adjoining area to be back filled without taking the time consuming precautions against rupturing of the laminates which were used in the past.

A further object of the present invention is to provide an improved laminate for preventing seepage through masonry walls or the like, which, in addition to vertically obviating the possibility of rupturing of the laminate due to back filling, as described above, also insures uniform wetting by controlled water diffusion into the laminate to thereby prevent erosion of the bentonite.

Yet another object of the present invention is to provide an improved laminate utilizing bentonite clay, an absorbent material, and a water impervious protective membrane, which insures longevity of the water barrier provided by the bentonite clay notwithstanding gradual deterioration of the absorbent sheathing by providing an impervious membrane which retains its physical characteristics regardless of its exposure to repeated wettings to thereby retain the bentonite clay in its intended position against the wall of a masonry structure for indefinite lengths of time.

A still further object of the present invention is to provide a laminate which is capable of providing both improved thermal insulation and water barrier action and therefore is manifestly suitable for use in wrapping around heat carrying steam and liquid conduits to thereby not only prevent heat losses but also prevent water seepage from said pipes.

Still another object of the present invention is to provide an improved laminated building component which can be placed on the inside of masonry foundation walls to act as a water barrier and thermal insulator. Other objects and attendant advantages of the present invention will readily be perceived hereafter.

In all of the forms of the present invention the improved laminate consists essentially of a layer of ground bentonite clay, a casing of permeable material to contain the bentonite and also permit water or other liquid to contact the bentonite to activate its water impeding characeristics, and an impervious membrane for retaining the bentonite clay in its intended orientation relative to a wall, pipe or the like, notwithstanding repeated wettings of said clay and notwithstanding the deterioration of the permeable material. In one form of the present invention, the impervious membrane is specifically perforated in a predetermined pattern to permit diffusion of water or liquid therethrough at a controlled rate for wetting the bentonite clay to activate it, the controlled rate preventing a washing or eroding action which could displace the clay. The toughness of the impervious membrane prevents the rupture of the permeable sheathing which could result in the loss of the granular bentonite clay.

In accordance with another embodiment of the present invention the impervious membrane is continuous, that is, it is not perforated so that it acts as a complete barrier against the passage of liquid. This is used on the inside of basement walls and on the outside of pipes. The clay absorbs any moisture but the impervious membrane prevents this moisture from going beyond it into the room. In addition, the sum of the insulating characteristics of the water permeable sheathing, which in this instance, is matted asbestos fiber paper and the thermal insulating characteristics of the bentonite clay and the water impervious material, provide a relatively high degree of thermal insulation in addition to the water barrier action described above. The present invention will be more fully understood when the following portions of the specification are read in conjunction with the accompanying drawing wherein:

FIGURE 1 is a fragmentary perspective view of the improved laminate of the present invention mounted against the internal wall of a masonry structure for the purpose of providing both a water barrier and thermal insulation;

FIGURE 2 is a cross sectional view taken substantially along line 2—2 of FIGURE 1;

FIGURE 3 is a fragmentary perspective view of an improved invention mounted on the external portion of a masonry wall;

FIGURE 4 is a cross sectional view showing the manner in which the improved laminate of the present invention may be utilized in both water barrier and thermal insulating relationship relative to a fluid carrying conduit;

FIGURE 5 is a cross sectional view of a modified form of the laminate of the present invention showing multiple layers; and FIGURE 6 is a fragmentary perspective view showing the manner in which the edges of the laminate are sealed against loss of the bentonite filler.

In FIGURES 1 and 2 one form of the present invention is shown. The improved laminate 10 is shown mounted on the inside of concrete wall 11, that is, the side of the wall which is in the basement. The improved laminate includes an absorbent sheet 12 which may be made of matted asbestos fibers. This sheet is commonly called asbestos paper. Essentially this sheet consists of matted asbestos fibers which are suitably bound as is well known in the art. Secured to absorbent sheet 12 by suitable adhesive at apieces 13 is corrugated asbestos paper 14 which may be of the same type as sheet 12 except for the fact that it is corrugated. It will be noted that the joined sheets 12 and 14 provide a porous casing having tubes or channels 15 which are filled with comminuted bentonite clay 15'. Bentonite clay having a particle size of which will pass through a 325 mesh sieve has been utilized effectively and bentonite clay falling within a size range which will pass through a 4 mesh sieve and which is so small as to pass through a 600 mesh sieve can be used with equal efficacy. Thus a size range of between about 4 mesh and 600 mesh can be used. The bentonite clay which has been used is of the type mined at Upton, Wyo., and Belle Fourche, S. Dak., by the American Colloid Company. Bentonite clay which is mined at Panther Creek, Miss., can also be used, especially in applications, such as shown in FIGS. 1 and 2, where a minimum of bentonite swelling can be tolerated, since the Panther Creek bentonite is of the nonswelling type.

Caps 16 (FIG. 6) are provided at opposite ends of the laminate formed by joined sheets 14 and 12 and these caps are formed essentially from tape having a portion 17 affixed by suitable adhesive to the opposite side of sheet 12 from sheet 14. The tape is cut along lines 18 at apices 13 and this tape is thereafter caused to adhere to the corrugation to form parts 19. The portion of the tap 20 closes the open ends of the channels 15. This same construction is utilized at both ends of the laminate thus far formed by sheets 12 and 14 to thereby effectively seal the bentonite clay therein.

It will readily be appreciated that the asbestos paper is highly susceptible to disintegration as a result of being wetted and therefore will deteriorate with repeated wettings. To compensate for the foregoing shortcoming, a liquid impervious membrane 21 is caused to adhere to sheet 12 by suitable adhesive or by other effective methods such as sewing, stapling, etc. A membrane which has been successfully used is commercially obtainable under the trademark Mylar and is fabricated by the Dupont Company. This is generically known as a polyester film and it is made from polyethylene terephthalate, the polymer formed by the condensation reaction of ethylene glycol and terephthalic acid. Any other suitable type of impervious membrane, such as polyethylene which will resist strain and abrasion may also be used. Other plastics which are water impervious and resistant to abrasion which may also be used are linear polyamides (nylon) and polyoxymethylene such as polymerized formaldehyde, an example of which is the material sold under the trademark Celcon by the Celanese Corporation.

It will also be appreciated that if desired asbestos paper sheet 12 may be coated to a desired thickness, by spraying, rolling or brushing, with a suitable water impervious plastic which is resistant to abrasion to thereby provide the same type of action noted above with respect to the separate membranes. A material which may be used for such coating is any suitable urethane composition in a xylene solvent. In this particular embodiment, after the coating hardens it may be perforated in any desired pattern by a sharp instrument which penetrates the coating but do not perforate the asbestos paper, to thereby permit water to seep into contact with the bentonite clay. However, the perforations are intended to be used when the panel is placed on the outside of a masonry wall, as described more fully relative to FIGURE 3.

As can be seen from FIGURE 1, impervious membrane 21 will prevent the passage of seepage of any water or in fact the passage of humidity into the inside of a basement because it essentially acts as a vapor barrier. It will also be appreciated that there is an extremely high insulation factor in the use of the foregoing laminate because of the additive insulating effects of the bentonite, asbestos paper, and the plastic membrane. In actual use, a facing of board or gypsum panels are mounted on the laminate 10 so that the latter is effectively located between the wall 11 and the boards or gypsum panels.

While the bentonite clay is shown only in channels 15, it will be appreciated that a cover sheet similar to sheet 12 may be attached to the opposite side of corrugated sheet 14 from sheet 12 to thereby provide an additional series of channels which may be filled with clay.

In FIGURE 3 a second type of laminate 25 made in accordance with the principle of the present invention is disclosed for use on the outside of basement walls to prevent water seepage therethrough. This embodiment differs from the embodiment of FIGURES 1 and 2 in that plastic membrane 22, which may be of the same material as membrane 21 and which is impervious to liquid in its original state, contains perforations 23 at suitably spaced locations. More specifically, concrete wall 24 is adapted to receive laminate 25 which includes a corrugated asbestos paper 26 fastened to planar asbestos paper 27 to form channels or tubes 28 therebetween, which comprise compartments and impervious sheet 22 is attached to sheet 27. The ends of tubes 28 are sealed in such a manner as shown in FIGURE 6, as described in detail above. The spaced apertures 23 permit water in the ground to diffuse into the water absorbent sheets 26 and 27 and reach the bentonite clay which is contained in tubular portions 28. As noted above, upon expanding, the bentonite clay will provide a water barrier to prevent the water diffusing through membrane 22 from passing through concrete wall 24. The membrane 22 is extremely tough and therefore when the area adjacent to the foundation is back filled, the abrasive action of the earth will not rupture it. This characteristic obviates the necessity of using an external panel, such as used in the past, for preventing the rupture of the sheets 26 and 27. If desired, a sheet such as 27 may be affixed to corrugated sheet 26 on the opposite side of the latter from sheet 27 to thereby provide another series of channels which may be filled with clay.

It will be appreciated that the asbestos sheets 26 and 27 will deteriorate and thus tend to disintegrate with repeated wettings. However, the water impervious sheet 22 will act to maintain both the sheets 26 and 27 and the bentonite clay therein in a layer against the external surface of concrete wall 24 notwithstanding such disintegration. It will also be noted that apertures 23 permit the water to diffuse into the bentonite at a relatively slow rate and therefore greatly reduce and virtually obviate the tendency of the bentonite clay to wash away. It is to be especially noted that the only difference between the embodiments of FIGURES 1 and 3 resides in the perforations 23.

In FIGURE 4 an alternate method of using the laminate of FIGURES 1 and 2 is shown. In this embodiment a pipe 29 has the laminate wound around it, the laminate meeting at seam 30, with suitable adhesive-backed tape 31 being used to fasten the ends of the laminate. It can readily be seen that water impervious sheet 21 is on the outside of pipe or conduit 29, which may carry either steam or hot water, and thus there is a three-fold thermal insulating action resulting from the asbestos sheeting 14 and 12, the impervious plastic laminate 21, and the bentonite clay in tubes 15. In addition, there is a combined sealing effect due to the water impeding characteristics of the bentonite clay and the impervious nature of membrane 21.

In FIGURE 5 a still further embodiment of the present invention is shown. This embodiment includes a plurality of layers of asbestos paper and bentonite clay to provide additional insulating characteristics for enhancing the thermal insulating function of the present invention. In this respect it can be seen that corrugated asbestos paper 32 is fastened, by suitable adhesive, to asbestos paper 33 at apices 34 to provide tubes or channels 35 which are filled with bentonite clay 36. Asbestos paper 33 in turn is secured, by suitable adhesive, to apices 37 of corrugated sheet 38 which in turn has apices 39 thereof fastened to planar asbestos sheet 40 by suitable adhesive. Channels or tubes 41 formed by the union of sheets 38 and 40 are filled with the same type of granular bentonite clay described above relative to FIGURES 1 and 2. It will be noted that there are also channels 43 which are formed between corrugated sheets 38 and the planar sheet 33. These channels may contain air for its insulating effect or, if desired, these channels may also be filled with bentonite clay. Planar sheet 40 has secured thereto an impervious sheet 44 of the same material as sheet 21 of FIGURES 1 and 2. As noted above, if the laminate of FIGURE 5 is to be used internally on pipes or on the insides of basement walls, then sheet 44 is unperforated to prevent the passage of moisture therethrough as well as adding to the insulating characteristics of the laminate. However, if the laminate of FIGURE 5 is to be used on the outside of a concrete wall where it is exposed to draining water, perforations such as 23 are provided therein for the purpose of permitting the water to diffuse into the laminate to thus activate the bentonite clay, without permitting the flow of water at a sufficiently great rate which will eventually erode and wash away the bentonite clay.

While asbestos paper has been described above as the casing for containing the pulverized bentonite clay, it will be appreciated that other suitable materials may be also used. In this respect suitable papers or cardboards may be used in applications wherein the heat insulation qualities of asbestos are not required. In addition, suitable fabrics may also be used, if desired, and these fabrics may include woven fabrics and nonwoven bonded fabrics.

Instead of the corrugated paper used in all of the embodiments of the present invention, hollow cylindrical tubes of a porous material, such as asbestos paper, may be used. In this construction, straight hollow cylindrical tubes are secured to a sheet, such as 12, of FIGURE 1 in parallel abutting relationship so that each tube abuts two adjacent tubes and the sheet to which it is attached. The attachment may be by gluing or any other suitable means. The hollow cylindrical tubes are filled with bentonite clay and the ends of the tubes are capped in a manner similar to that shown in FIGURE 6.

We claim:
1. A laminate for preventing seepage of liquid into a wall and for permitting the area adjacent said wall to be filled with earth without rupturing said laminate as a result of abrading action incidental to said filling comprising a porous casing member, compartments in said laminate, bentonite clay held in position in said compartments by said casing member, a tenacious plastic membrane attached to said casing member and forming the outside of said laminate and facing away from said wall for permitting earth to be dropped adjacent thereto without rupturing said laminate and said laminate being sufficiently porous to permit liquid to diffuse thereinto for wetting said bentonite clay to thereby cause said bentonite clay to become active and provide a water barrier, said tenacious plastic membrane being capable of retaining its resistance to deterioration regardless of the extent of wetting to which it is subjected thereby maintaining said bentonite clay in position relative to said wall notwithstanding any possible deterioration of said casing member due to repeated wettings.

2. A laminate as set forth in claim 1 wherein said tenacious plastic membrane includes apertures therein for permitting said liquid to pass therethrough.

3. A laminate as set forth in claim 1 wherein said porous casing member consists of asbestos paper.

References Cited

UNITED STATES PATENTS

| | | | |
|---|---|---|---|
| 1,466,462 | 8/1923 | Bachman | 161—133 XR |
| 2,251,372 | 8/1941 | Nicholson | 161—113 XR |
| 3,097,124 | 7/1963 | Denenberg | 161—113 |
| 3,186,896 | 6/1965 | Clem | 161—133 |

ROBERT F. BURNETT, *Primary Examiner.*

ROGER H. CRISS, *Assistant Examiner.*

U.S. Cl. X.R.

52—169, 513; 161—121

PO-1050
(5/69)

UNITED STATES PATENT OFFICE
CERTIFICATE OF CORRECTION

Patent No. 3,445,322        Dated May 20, 1969

Inventor(s) Samuel N. Saiia and Louis L. Chiusolo

It is certified that error appears in the above-identified patent and that said Letters Patent are hereby corrected as shown below:

Column 2, line 12, change "vertically" to --virtually--; lines 54 and 55, change "prevening" to --preventing--.

Column 3, line 12, after "improved" insert --laminate made in accordance with the principles of the present--; line 33, change "apieces" to --apices--; line 58, change "tap" to --tape--.

SIGNED AND
SEALED

NOV 18 1969

(SEAL)
Attest:

Edward M. Fletcher, Jr.
Attesting Officer

WILLIAM E. SCHUYLER, JR.
Commissioner of Patents